United States Patent [19]

Anstedt

[11] Patent Number: 4,467,709
[45] Date of Patent: Aug. 28, 1984

[54] SMOKER GRILL ATTACHMENT

[76] Inventor: Charles T. Anstedt, 131 Hickory St., Williams Bay, Wis. 53191

[21] Appl. No.: 429,019

[22] Filed: Sep. 30, 1982

[51] Int. Cl.³ ............................................. A23B 4/04
[52] U.S. Cl. ...................................... 99/482; 99/446; 126/9 R; 126/25 R
[58] Field of Search ................. 99/467, 385, 343, 352, 99/400, 444, 446, 448, 474, 482; 126/25 R, 25 A, 41 R, 9 R, 275 R; 426/418

[56] References Cited

U.S. PATENT DOCUMENTS

| | | | |
|---|---|---|---|
| 3,776,127 | 12/1973 | Muse | 99/482 |
| 3,851,639 | 12/1974 | Beddoe | 126/25 R |
| 3,974,760 | 8/1976 | Ellis | 99/482 |
| 4,094,295 | 6/1978 | Boswell et al. | 99/444 X |
| 4,334,462 | 6/1982 | Hefling | 126/25 R |

Primary Examiner—Timothy F. Simone

Attorney, Agent, or Firm—Andrus, Sceales, Starke & Sawall

[57] ABSTRACT

An apparatus for converting a kettle-type food cooker into a food smoker includes an upright cylindrical housing having an open top and bottom with a grill support at its upper end and a water pan support at its lower end. The housing is positionable between a fuel-holding base and a cover for the food cooker in a vertically stacked arrangement to define a smoking chamber. The grill support and pan support both include brace members extending across the interior of the housing. The lower brace member has a downwardly offset central portion and a cross bracket for removably receiving and supporting the water pan. The housing also includes an access opening at its lower end, and a movable door to cover the access opening and permit the supply of fuel to be replenished.

1 Claim, 4 Drawing Figures

4,467,709

SMOKER GRILL ATTACHMENT

BACKGROUND OF THE INVENTION

The present invention relates to food smoking apparatus, and more particularly to an apparatus for converting an enclosable kettle-type food cooker into a food smoker.

Various types of arrangements are known for smoking food such as fish or meat. For example, U.S. Pat. No. 4,094,295 shows a three-piece smoking device, and U.S. Pat. No. 3,851,639 shows a cooking apparatus adapted to perform a multiplicity of cooking operations including smoking. In addition, U.S. Pat. No. 4,140,049 shows an apparatus for converting an enclosable kettle-type food cooker into a food smoker. While devices such as those referred to above work satisfactorily for their intended purposes, there remains a need for a simple, inexpensive apparatus which a consumer can use to prepare smoked food at home.

SUMMARY OF THE INVENTION

An apparatus for converting a kettle-type food cooker into a food smoker. The apparatus includes an upright cylindrical housing having an open top and bottom which is positionable between the fuel-holding base and cover of the food cooker in a vertically stacked arrangement.

The apparatus includes a grill support means at the upper end of the housing for removably supporting a food grill in the smoking chamber, and pan support means at the lower end of the housing for removably supporting a disposable liquid steaming pan in the smoking chamber. The grill support means includes a pair of inwardly extending tabs positioned on diametrically opposite sides of the housing and an upper brace member extending across the interior of the housing. The pan support means includes a lower brace member extending across the interior of the housing and engaging the bottom of the liquid pan. The lower brace member includes a downwardly offset portion at the center of the housing, and a bracket member secured to the offset portion which extends in a direction normal thereto. The brace and bracket members each include a pair of spaced vertically extending abutment surfaces for supporting the sides of the pan.

The upright cylindrical housing includes an access opening at its lower end, a door to the access opening and mounting means for movably mounting the door on the housing. The door provides access to the smoking chamber thereby enabling the supply of fuel, liquid or smoke producing material to be replenished without lifting the housing off of the base or the cover off of the housing so that the previously heated smoke within the chamber is retained therein throughout the smoking process. The mounting means includes a pair of spring loaded fasteners extending through the door and housing to movably fasten the door to the housing.

The present invention thus provides an apparatus for converting a kettle-type food cooker into a smoker which is simple in construction, effective for smoking various types of food, inexpensive to manufacture, and easy to use.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
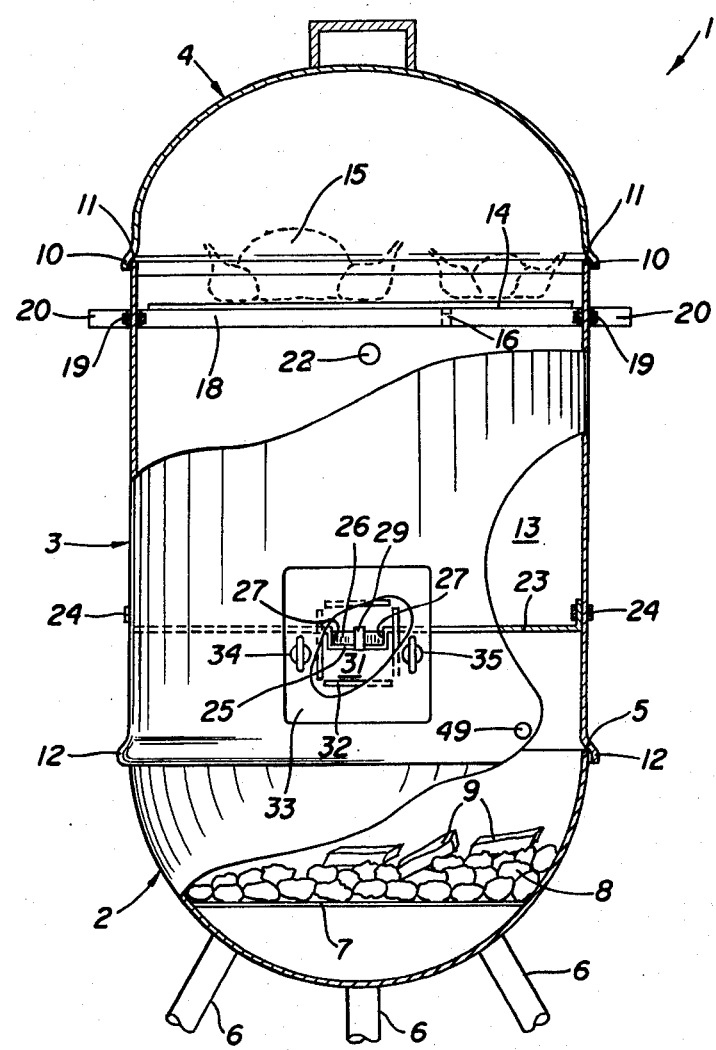
FIG. 1 is a side view in elevation with parts broken away and in section illustrating a kettle-type food cooker having the apparatus of the invention incorporated therewith.
Figure 2:
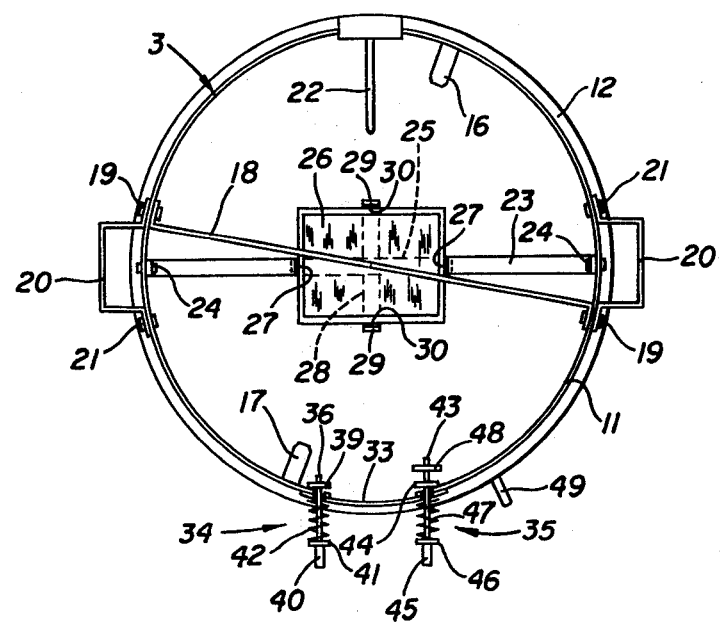
FIG. 2 is a top plan view of the food cooker of FIG. 1 with the cover and food grill removed.

Referring now to the drawings, FIGS. 1 and 2 illustrate a kettle-type food cooker converted into a food smoker 1 in accordance with the principles of the present invention. The food smoker 1 includes a hemispherically shaped fuel-holding base 2, an upright cylindrical housing 3, and a hemispherical or dome-shaped cover 4. Although the base 2 and cover 4 are illustrated as having a hemispherical shape, the conversion apparatus of the present invention will work equally well with food cookers having other designs. Thus, the term "cylindrical" as used herein to define the shape of housing 3 may include other configurations, such as rectangular or square, depending upon the shape of base 2 and cover 4.

Base 2 is hemispherical in shape and includes an annular edge 5 at its upper end and three legs 6 connected to its lower end for supporting the food smoker 1 off the ground. The lower end of base 2 also includes a plurality of louver-type vents (not shown) which are used to adjust the amount of air passing into the food smoker 1. A grill 7 is also contained within the bottom of base 2 for supporting a plurality of charcoal briquettes 8 and smoke producing material 9. The smoke producing material 9 is placed on top of the charcoal 8 and may be pieces of fruitwood, hard wood or other woods or materials which provide aromatic smoke when heated. Thus, the function of base 2 is to hold and contain the fuel 8 and smoke producing materials 9 as well as support housing 3 and cover 2.

The cover 4 is also hemispherical or dome-shaped in configuration, and includes an outwardly directed annular flange 10 at its lower end. The diameter of flange 10 substantially corresponds to the diameter of the edge 5 of base 2 as shown in FIG. 1. A handle 11 is attached to the center at the top of cover 4 which enables cover 4 to be lifted off of housing 3.

Housing 3 is cylindrical in shape and is open at its top and bottom. The open top of housing 3 is defined by an annular edge 11 at its upper end while the open bottom is defined by an outwardly directed annular flange 12. As shown, the top edge 11 has a diameter which is substantially the same as the diameter of flange 10 of cover 4 so that flange 10 of cover 4 freely rests upon top edge 11 of housing 3 in an overlapping relation to provide a substantially air tight seal therewith. The bottom flange 12 of housing 3 also has a diameter substantially the same as the diameter of top edge 5 of base 2 so that flange 12 freely rests upon edge 5 in overlapping relation therewith to provide a substantially air tight seal. Thus, as shown in FIG. 1, housing 3 is positioned between the fuel-holding base 2 and cover 4 so that the base 2, housing 3 and cover 4 may be orientated in a vertically stacked arrangement to define a smoking chamber 13 with base 2 supporting housing 3 and housing 3 supporting cover 4.

Housing 3 also includes a support means at its upper end for supporting a food grill 14. The grill 14 is of a conventional type having a framework of parallel crisscrossing metal bars or wires, and as shown is utilized to support the food 15 to be smoked. As shown best in FIG. 2, the support means for grill 14 includes a pair of tabs 16 and 17 extending radially inwardly from the sides of housing 3. The tabs 16 and 17 are positioned diametrically opposite one another and are L-shaped in configuration. One leg of each tab 16 and 17 may be bolted or welded to the inner surface of housing 3 while the other leg extends inwardly to provide the support for grill 14. In addition to the tabs 16 and 17, the grill support means includes an upper brace member 18 which extends across the interior of housing 3. Brace member 18 is in the form of a thin elongate member having a pair of flanges at its opposite ends which permit it to be secured to the side wall of housing 3 by means of a pair of bolts 19.

A pair of handles 20 are secured to the other surface of housing 3. The handles enable housing 3 and cover 4 to be lifted off of base 2 when desired. The handles 20 are bolted to housing 3 at one end by means of the bolts 19 for brace member 18 and at their other end by means of another pair of bolts 21. A temperature sensing probe 22 is also located at the upper end of housing 3. As shown in FIG. 2, probe 22 extends radially inwardly toward the center of chamber 13 and is positioned immediately beneath grill 14 so as to provide an accurate temperature reading. It should be noted that probe 22 is preferably of the type which may be read from the exterior so that the cover 4 need not be lifted off of housing 3.

A pan support means is located at the lower end of housing 3 which includes a lower brace member 23 extending across the interior of housing 3 and attached to the sides thereof by bolts 24. Brace member 23 is an elongate thin member which includes a downwardly offset portion 25 located in the center of chamber 13. The offset portion 25 extends beneath and supports the bottom of a disposable aluminum liquid steaming pan 26, and defines a pair of spaced abutment surfaces 27 which engage and support one pair of opposite sides of pan 26. As shown best in FIG. 2, a cross bracket member 28 is attached to the offset portion 26 and extends in a direction normal thereto. Bracket member 28 includes a pair of upwardly extending flanges 29 at its opposite ends which define a pair of vertically extending abutment surfaces 30 on their inner sides for engaging and supporting the other pair of opposite sides of pan 26. Pan 26 may be filled with wine, beer or juices, but is preferably filled with water which will vaporize during the smoking process to absorb some of the heat of the smoke. This reduces the normal cooking rate of the food placed within smoker 1 and provides added moisture to the space surrounding food 15. Thus, the food 15 may be smoked at a slow rate without significant dehydration or loss of natural juices.

As shown best in FIG. 1, housing 3 also includes an access opening 31 disposed at its lower end. As shown opening 31 is square in shape with its edges protected by four resilient U-shaped members 32. The members 32 cover any sharp edges or burrs which may have been formed when the opening 31 was cut in housing 3 during the manufacturing process so that a person will not cut his hand upon using smoker 1. The access opening 31 is covered by means of a door 33 which is dimensioned larger than the opening 31 and thus overlaps the portions of housing 3 which are adjacent to and surround opening 31.

A pair of spring loaded fasteners 34 and 35 are utilized to movably mount door 33 to housing 3. As shown best in FIGS. 3 and 4, fastener 34 includes a shaft 36 extending through an opening 37 in door 33 and an opening 38 in housing 3. The opening 37 is circular in shape while the opening 38 is in the shape of a slot which extends vertically in its longitudinal direction. The inner end of shaft 36 includes a cross pin 39 extending normal to the direction of the axis of shaft 36. The diameter and length of pin 39 is less than the width and length of slot 38. The outer end of shaft 36 includes a wooden grip 20 threadedly attached thereto which includes a flange member 41. A coil spring 42 surrounds shaft 36 and extends between the outer surface of door 33 and flange member 41. Spring 42 is utilized to bias the fastener 34 to the right as shown in FIGS. 3 and 4.

Figure 3:
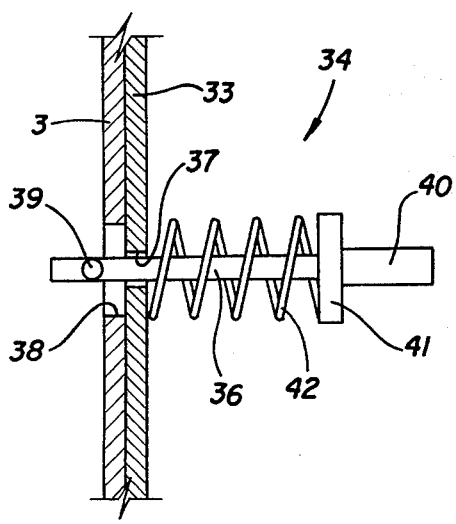
FIG. 3 is a detailed fragmentary side view in elevation showing one of the door fasteners in its locked position.
Figure 4:
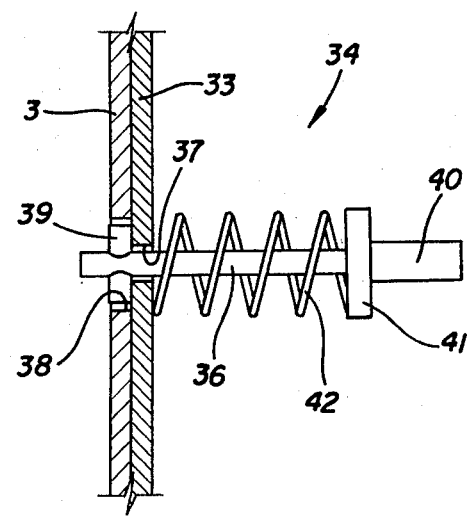
FIG. 4 is a view similar to FIG. 3 showing the door fastener in its unlocked position.

In operation, fastener 34 is shown in FIG. 3 in its locked position with pin 39 extending across the width of slot 38. Since pin 39 has a longitudinal dimension which is greater than the width of slot 38, pin 39 cannot pass through slot 38 and spring 42 biases shaft 36 to the right to hold door 33 firmly against the outer surface of housing 3. In order to unlock door 33, one must merely push against the force of spring 42, i.e. push shaft 36 to the left as shown in FIGS. 3 and 4, and rotate shaft 36 90°. This rotation results in the longitudinal dimension of pin 39 being in registry with the longitudinal direction of slot 38, as shown in FIG. 4. Since the diameter of pin 39 is less than the width of slot 38, pin 39 may be moved through slot 38 to engage door 33 as shown in FIG. 4. Thus, door 33 is unlocked or released from housing 3. In order to once again fasten the door in position on housing 3 the reverse procedure is performed.

It should be noted that fastener 35 is substantially identical to fastener 34 and includes a shaft 33 having a cross pin 44 at its inner end, a grip 45 at its outer end including a flange 46, and a spring 47 surrounding shaft 43 extending between flange 46 and the outer surface of door 33. Although fastener 35 operates to lock and unlock door 33 in substantially the same manner as fastener 34, fastener 35 in addition functions to provide a pivot connection for door 33 so that door 33 does not fall off of housing 3 when unlocked. In order to accomplish this, shaft 43 of fastener 35 is slightly longer than shaft 36 of fastener 34 and includes at its extreme inner end a lock washer 48 pushed thereon and snapped into an annular groove. Thus, when fastener 35 unlocks door 33 the washer 48 will not pass through slot 38 in housing 3 but instead will provide a loose pivot connection for door 33 so that it may be rotated in a clockwise direction in order to permit access to smoking chamber 13 through opening 31. As shown in FIGS. 1 and 2, a projecting finger 49 is located at the lower end of housing 3 which functions to engage the edge of door 33 to hold the door in position away from opening 31 and to prevent the door 33 from swinging loosely from fastener 35.

In operation, when it is desired to smoke food charcoal 8 is placed on grill 7 and ignited. Thereafter, a plurality of wood chips or other smoke producing material 9 is placed on top of the charcoal 8, and housing 3 containing a pan 26 is placed on top of base 2. The pan 26 is then filled with liquid to be steamed through opening 31 by unlocking door 33. Door 31 is then relocked in position on housing 3 and food grill 14 is positioned at the upper end of housing 3. Following this, cover 4 is placed on top of housing 3 and the air vents located at the bottom of base 3 are adjusted to provide the desired amount of smoke. After the liquid in pan 26 is heated sufficiently to produce steam, the food 15 is placed on grill 14. If additional charcoal 8 or wood chips 9 are required, the door 33 may be opened as previously described to permit access to chamber 13 through opening 31. The additional charcoal 8 or smoke producing material 9 may then be inserted into chamber 13 and door 33 may then be once again locked in position covering opening 31. After the food 15 is smoked, the pan 26 may be thrown away or reused, as desired.

A good smoker 1 has been shown and described which is simple in construction, effective for smoking various types of food, relatively inexpensive to manufacture, and easy to use.

Various modes of carrying out the invention are contemplated as being within the scope of the following claims particularly pointing out and distinctly claiming the subject matter which is regarded as the invention.

I claim:

1. An apparatus for converting a kettle-type food cooker having a fuel-holding base and a cover for enclosing the base into a food smoker, comprising:

an upright cylindrical housing having an open top and bottom, said housing positionable between the fuel-holding base and cover so that the base, housing and cover may be orientated in a vertically stacked arrangement to define a smoking chamber;

grill support means at the upper end of said housing for removably supporting a grill in said smoking chamber; and pan support means including a brace member extending across the lower end of said housing and engaging the bottom of a liquid steaming pan to removably support said pan in said smoking chamber;

and wherein: said grill support means includes a pair of distally opposite inwardly extending tabs mounted on the inner surface of said housing, and an elongate cross bar brace member extending across the interior of said housing substantially coplanar with and crossecting a line between said tabs and having distal ends mounted to distally opposing side walls of said housing, said cross bar brace member engaging the underside of said grill along a sectional line therethrough to support said grill centrally in addition to support along peripheral edges of said grill provided by said tabs and said distal ends of said cross bar brace member;

said pan support means includes a second cross bar brace member extending across the interior of said housing and having distal ends mounted to distally opposing side walls of said housing, and a bracket member secured to said second cross bar brace member and extending thereacross, said second cross bar brace member and said bracket member including a plurality of spaced generally vertical abutment surfaces defining a peripheral boundary with sides formed by said vertical abutment surfaces and a bottom formed by said second cross bar brace member and said bracket member for supporting and retaining bottom and side walls of a disposable pan along the bottom and side periphery thereof;

said housing includes an access opening with an openable door aligned with said pan to be at substantially the same vertical height;

the open top end of said housing is defined by an upper annular edge;

the open bottom end of said housing is defined by a lower outwardly directed annular flange;

said cover has a lower outwardly directed annular flange;

said base has an upper annular edge;

said upper edge of said housing has an outer diameter substantially the same as and mating with the inner diameter of said lower outwardly directed annular flange of said cover, such that said flange of said cover freely rests on said upper annular edge of said housing in overlapping relation to provide a substantially air tight seal therewith; and said lower flange of said housing has an inner diameter substantially the same as and mating with the outer diameter of said upper annular edge of said base, such that said flange of said housing freely rests on said upper annular edge of said base in overlapping relation to provide a substantially air tight seal therewith.

* * * * *